(12) United States Patent
Kuroda et al.

(10) Patent No.: US 10,640,390 B2
(45) Date of Patent: May 5, 2020

(54) ALUMINA POWDER

(71) Applicant: TAKI CHEMICAL CO., LTD., Kakogawa-shi (JP)

(72) Inventors: Taketoshi Kuroda, Kakogawa (JP); Taku Tsuneishi, Kakogawa (JP); Masaki Terao, Kakogawa (JP)

(73) Assignee: TAKI CHEMICAL CO., LTD., Kakogawa-Shi (JP)

( * ) Notice: Subject to any disclaimer, the term of this patent is extended or adjusted under 35 U.S.C. 154(b) by 0 days.

(21) Appl. No.: 16/462,253

(22) PCT Filed: Dec. 6, 2017

(86) PCT No.: PCT/JP2017/043802
§ 371 (c)(1),
(2) Date: May 20, 2019

(87) PCT Pub. No.: WO2018/110384
PCT Pub. Date: Jun. 21, 2018

(65) Prior Publication Data
US 2019/0337814 A1 Nov. 7, 2019

(30) Foreign Application Priority Data

Dec. 12, 2016 (JP) ................. 2016-239969

(51) Int. Cl.
*C09C 1/40* (2006.01)
*C01F 7/02* (2006.01)
*B01F 3/12* (2006.01)

(52) U.S. Cl.
CPC ............. *C01F 7/026* (2013.01); *B01F 3/12* (2013.01); *B01F 2003/125* (2013.01); *C01P 2006/60* (2013.01)

(58) Field of Classification Search
CPC ........ B01F 2003/125; B01F 3/12; C01F 7/02; C01F 7/026; C01P 2006/60; C01P 2004/61; C01P 2004/62; C01P 2006/22
See application file for complete search history.

(56) References Cited

U.S. PATENT DOCUMENTS

| | | | | |
|---|---|---|---|---|
| 7,638,105 | B2* | 12/2009 | Wang | C01F 7/02 423/111 |
| 8,147,795 | B2* | 4/2012 | Dolling | B01J 21/04 423/625 |
| 2005/0090595 | A1* | 4/2005 | Nippa | B82Y 30/00 524/437 |
| 2006/0246000 | A1* | 11/2006 | Dolling | B01J 21/04 423/625 |
| 2019/0337814 | A1* | 11/2019 | Kuroda | B01F 3/12 |

FOREIGN PATENT DOCUMENTS

| | | |
|---|---|---|
| JP | 2005-126287 A | 5/2005 |
| JP | 2009-513464 A | 4/2009 |
| JP | 2012-131653 A | 7/2012 |
| JP | 2014-062011 A | 4/2014 |
| JP | 2014-133687 A | 7/2014 |
| JP | 2014-227320 A | 12/2014 |

OTHER PUBLICATIONS

International Preliminary Report on Patentability and Written Opinion in International Application No. PCT/JP2017/043802 dated Jun. 18, 2019, 10 pages.
International Application No. PCT/JP2017/043802, International Search Report and Written Opinion, dated Jan. 16, 2018.

* cited by examiner

Primary Examiner — Michael A Salvitti
(74) Attorney, Agent, or Firm — Marshall, Gerstein & Borun LLP

(57) ABSTRACT

An alumina powder containing a hydroxycarboxylic acid and an alkaline component contains amorphous alumina, pseudoboehmite, or boehmite, and satisfies all of (1) to (4). (1) A colloidal dispersion A with 2.5% by mass of $Al_2O_3$ consisting of the alumina powder and distilled water is free from precipitate, and has a light transmittance of at least 80% measured at a wavelength of 500 nm and an optical path length of 10 mm. (2) A colloidal dispersion B with 15% by mass of $Al_2O_3$ consisting of the alumina powder and distilled water is free from precipitate. (3) The dispersions A and B have a pH in a range of 5 to 8. (4) A colloidal dispersion C with 2.5% by mass of $Al_2O_3$ consisting of the alumina powder and methanol is free from precipitate, and has a light transmittance of at least 80% measured under the above condition.

11 Claims, No Drawings

ALUMINA POWDER

FIELD

The present invention relates to alumina powder.

BACKGROUND

Alumina has properties useful in a wide variety of applications. Various techniques have been developed for alumina powder to provide, for example, transparent liquids containing alumina powder dispersed in water.

For example, Patent Literature 1 describes a technique associated with hydrated alumina particulate powder. In each of examples 1 to 10, a liquid was prepared by dispersing, in pure water, the hydrated alumina particulate powder to have an $Al_2O_3$ concentration of 2.2% by weight. Each liquid, measured with a spectrophotometer (at a measurement wavelength of 500 nm), showed a light transmittance of 30 to 32% (Table 2 in Patent Literature 1). The gel before spray-drying into the powder had a pH of 3.5 to 4.1 (Table 1 in Patent Literature 1).

CITATION LIST

Patent Literature

Patent Literature 1: Japanese Unexamined Patent Application Publication No. 2014-133687

BRIEF SUMMARY

Technical Problem

An object of the present invention is to develop alumina powder for a colloidal dispersion containing alumina colloidal particles dispersed in a liquid without forming a precipitate. The alumina powder has the following characteristics: the alumina powder dispersed in water shows a near neutral pH, and forms a high-concentration colloidal dispersion, and the alumina powder dispersed in water or methanol forms a highly transparent colloidal dispersion.

Solution to Problem

An alumina powder according to a first aspect of the present invention includes a hydroxycarboxylic acid and an alkaline component. The alumina powder contains amorphous alumina, pseudoboehmite, or boehmite. The alumina powder satisfies all of (1) to (4):

(1) a colloidal dispersion A with 2.5% by mass of $Al_2O_3$ consisting of (or consisting essentially of) the alumina powder and distilled water is free from precipitate, and the colloidal dispersion A has a light transmittance of at least 80% measured at a wavelength of 500 nm and an optical path length of 10 mm, (2) a colloidal dispersion B with 15% by mass of $Al_2O_3$ consisting of (or consisting essentially of) the alumina powder and distilled water is free from precipitate, (3) the colloidal dispersion A and the colloidal dispersion B each have a pH in a range of 5 to 8, and (4) a colloidal dispersion C with 2.5% by mass of $Al_2O_3$ consisting of (or consisting essentially of) the alumina powder and methanol is free from precipitate, and the colloidal dispersion C has a light transmittance of at least 80% measured at a wavelength of 500 nm and an optical path length of 10 mm.

An alumina powder according to a second aspect of the present invention is the alumina powder according to the first aspect in which the hydroxycarboxylic acid is at least one component selected from the group consisting of lactic acid, malic acid, glycolic acid, citric acid, and tartaric acid.

An alumina powder according to a third aspect of the present invention is the alumina powder according to the first or second aspect in which the alkaline component is at least one component selected from the group consisting of an alkali metal, ammonia, and a water-soluble amine compound.

An alumina powder according to a fourth aspect of the present invention is the alumina powder according to any one of the first to third aspects satisfying at least one of (5) to (7):

(5) the colloidal dispersion A and the colloidal dispersion B are free from precipitate after stored at 25° C. for one month, (6) the colloidal dispersion A stored at 25° C. for one month has a light transmittance change within ±5% from a light transmittance of the colloidal dispersion A immediately after production, and (7) the colloidal dispersion A stored at 25° C. for one month has a viscosity change within ±25% from a viscosity of the colloidal dispersion A immediately after production.

An alumina powder according to a fifth aspect of the present invention is the alumina powder according to any one of the first to fourth aspects in which (8) the colloidal dispersion A immediately after production has a viscosity of 20 mPa·s or less.

An alumina powder according to a sixth aspect of the present invention is the alumina powder according to the fifth aspect satisfying at least one of (9) and (10):

(9) the colloidal dispersion A with the pH adjusted to 1 immediately after production using 10% by mass of aqueous nitric acid solution has a viscosity of 20 mPa·s or less, and

(10) the colloidal dispersion A with the pH adjusted to 14 immediately after production using 10% by mass of aqueous sodium hydroxide solution has a viscosity of 20 mPa·s or less.

A colloidal dispersion according to a seventh aspect of the present invention contains the alumina powder according to any one of the first to sixth aspects dispersed in a liquid.

Advantageous Effects

The alumina powder according to the above aspects of the present invention is dispersible in water or methanol into a highly transparent colloidal dispersion, and is dispersible in water into a high-concentration colloidal dispersion with a near neutral pH. The alumina powder is thus suitable for mixing with various materials, and is specifically suitable for applications that use high transparency.

DETAILED DESCRIPTION

Embodiments of the present invention will be described in detail. However, the present invention is not limited to the embodiments described below, and may be modified variously without departing from the spirit and scope of the invention as claimed.

The numerical range specified herein as "numerical value 1 to numerical value 2" refers to a range from numerical value 1 as a lower limit to numerical value 2 as an upper limit both inclusive, and equates to being at least numerical value 1 and not greater than numerical value 2.

An alumina powder according to one or more embodiments of the present invention contains a hydroxycarboxylic acid and an alkaline component. The alumina powder contains amorphous alumina, pseudoboehmite, or boehmite, and satisfies all of (1) to (4).

(1) A colloidal dispersion A with 2.5% by mass of $Al_2O_3$ consisting of the alumina powder and distilled water is free from precipitate, and the colloidal dispersion A has a light transmittance of at least 80% measured at a wavelength of 500 nm and an optical path length of 10 mm.

(2) A colloidal dispersion B with 15% by mass of $Al_2O_3$ consisting of the alumina powder and distilled water is free from precipitate.

(3) The colloidal dispersion A and the colloidal dispersion B each have a pH in a range of 5 to 8.

(4) A colloidal dispersion C with 2.5% by mass of $Al_2O_3$ consisting of the alumina powder and methanol is free from precipitate, and the colloidal dispersion C has a light transmittance of at least 80% measured at a wavelength of 500 nm and an optical path length of 10 mm.

The feature (1) is directed to a colloidal dispersion containing 2.5% by mass of $Al_2O_3$ prepared by mixing the alumina powder according to one or more embodiments of the present invention with distilled water. The colloidal dispersion herein is referred to as colloidal dispersion A. The colloidal dispersion A is free from precipitate, and has a light transmittance of at least 80%. The light transmittance of the colloidal dispersion A is much higher than the light transmittance of a dispersion obtained using the alumina powder described in Patent Literature 1. The alumina powder according to one or more embodiments can be used to prepare the colloidal dispersion A with such a high light transmittance that can be used in applications with designs. The light transmittance according to the feature (1) is preferably at least 85%, and more preferably at least 90%.

In the feature (2), the alumina powder according to one or more embodiments can be used to obtain a high-concentration colloidal dispersion. More specifically, the feature (2) is directed to a colloidal dispersion containing 15% by mass of $Al_2O_3$ prepared by mixing the alumina powder according to one or more embodiments with distilled water. This colloidal dispersion herein is referred to as colloidal dispersion B. The feature (2) of the colloidal dispersion B containing a high concentration of 15% by mass of $Al_2O_3$ and free from precipitate is notable over conventional techniques associated with alumina powder. Further, the colloidal dispersion B may preferably have a light transmittance of at least 50%, and more preferably at least 60%.

In the feature (3), the colloidal dispersion A and the colloidal dispersion B each have a pH in a range of 5 to 8, which includes a neutral range.

The feature (4) is directed to a colloidal dispersion containing 2.5% by mass of $Al_2O_3$ prepared by mixing the alumina powder according to one or more embodiments with methanol. The colloidal dispersion herein is referred to as colloidal dispersion C. The colloidal dispersion C is free from precipitate, and has a light transmittance of at least 80%. The colloidal dispersion C may preferably have a light transmittance of at least 85%, and more preferably at least 90%. The colloidal dispersion A, the colloidal dispersion B, and the colloidal dispersion C may contain ionic aluminum.

The alumina powder according to one or more embodiments contains amorphous alumina, pseudoboehmite, or boehmite. The alumina powder containing amorphous alumina or pseudoboehmite produces notable effects of the present invention. The crystalline structure of alumina may be analyzed with an ordinary method, and may preferably be analyzed using powder X-ray diffraction.

Any hydroxycarboxylic acid may be used. Examples include lactic acid, malic acid, glycolic acid, citric acid, and tartaric acid. A hydroxycarboxylic acid may be used alone, or two or more hydroxycarboxylic acids may be used. An alumina powder containing a hydroxycarboxylic acid with a smaller total number of carboxyl groups and hydroxyl groups tends to produce a more stable colloidal dispersion containing the alumina powder dispersed in water or methanol. The hydroxycarboxylic acid preferably has a total number of carboxyl groups and hydroxyl groups not greater than 3. The hydroxycarboxylic acid illustrated as above may contain lactic acid (one carboxyl group and one hydroxyl group), malic acid (two carboxyl groups and one hydroxyl group), glycolic acid (one carboxyl group and one hydroxyl group), citric acid (three carboxyl groups and one hydroxyl group), and tartaric acid (two carboxyl groups and two hydroxyl groups). Among them, a hydroxycarboxylic acid containing a total number of carboxyl groups and hydroxyl groups not greater than 3 includes lactic acid, malic acid, or glycolic acid. Although two or more hydroxycarboxylic acids each containing a total number of carboxyl groups and hydroxyl groups not greater than 3 may be in any combination, a combination of hydroxycarboxylic acids may preferably be a combination of lactic acid and malic acid, a combination of lactic acid and glycolic acid, or a combination of lactic acid, malic acid, and glycolic acid. For two or more hydroxycarboxylic acids at least one of which contains a total number of carboxyl groups and hydroxyl groups greater than 3, the percentage of the hydroxycarboxylic acid containing the total number of carboxyl groups and hydroxyl groups greater than 3 with respect to the total amount of hydroxycarboxylic acids may preferably be not greater than 70% by mass, more preferably not greater than 50% by mass, still more preferably not greater than 30% by mass, and still more preferably not greater than 10% by mass.

Any alkaline component may be used. Preferable examples include alkali metals, ammonia, and water-soluble amine compounds. An alkaline component may be used alone, or two or more alkaline components may be used. Preferable examples of the alkali metals include sodium and potassium. Examples of the water-soluble amine compounds include primary amines, secondary amines, tertiary amines, and quaternary ammonium hydroxides. Examples of the primary amines include methylamine, ethylamine, butylamine, monoethanolamine, and isopropanolamine. Examples of the secondary amines include dimethylamine, diethylamine, diethanolamine, and diisopropanolamine. Examples of the tertiary amines include trimethylamine, triethanolamine, and triisopropanolamine. Examples of the quaternary ammonium hydroxides include tetramethylammonium hydroxide, tetraethylammonium hydroxide, tetrapropylammonium hydroxide, tetrabutylammonium hydroxide, trimethylethylammonium hydroxide, trimethylpropylammonium hydroxide, dimethyldiethylammonium hydroxide, and choline. Among them, quaternary ammonium hydroxides and ammonia can preferably be used for their dispersion stability. Among the quaternary ammonium hydroxides, tetramethylammonium hydroxide, tetraethylammonium hydroxide, and choline may be used for their effective dispersion stability and availability. The alumina powder according to one or more embodiments may contain an accessory component derived from an alkaline-component-containing compound used as a starting material in manufacturing the alumina powder. When the alkaline-component-containing compound is a carbonate or a hydrogencarbonate of an alkali metal or ammonia, the accessory component may be, for example, a carbonate ion or hydrogencarbonate ion. When the alkaline-component-containing compound is urea, the accessory component may be a component resulting from decomposition of urea other than ammonia.

The alumina powder according to one embodiment of the present invention satisfies at least one of (5) to (7), in addition to the features (1) to (4).

(5) The colloidal dispersion A and the colloidal dispersion B are free from precipitate after stored at 25° C. for one month.

(6) The colloidal dispersion A stored at 25° C. for one month has a light transmittance change within ±5% from a light transmittance of the colloidal dispersion A immediately after production.

(7) The colloidal dispersion A stored at 25° C. for one month has a viscosity change within ±25% from a viscosity of the colloidal dispersion A immediately after production.

The feature (5) reveals the high storage stability of both the colloidal dispersion A and the colloidal dispersion B based on whether the precipitate forms. Further, the alumina powder according to one or more embodiments is used to obtain a colloidal dispersion having high storage stability when containing 2.5 to 15% by mass of $Al_2O_3$.

The features (6) and (7) reveal the storage stability of the colloidal dispersion A based on their light transmittance and viscosity. The light transmittance change is calculated using the mathematical equation for the percentage of light transmittance change=$|t1-t0|\div t0 \times 100$, where t0(%) is the light transmittance of the colloidal dispersion A immediately after production, and t1(%) is the light transmittance of the colloidal dispersion A after stored at 25° C. for one month. The symbol $\|$ indicates an absolute value. Further, the viscosity change is calculated using the mathematical equation for the percentage of viscosity change=$|v1-v0|\div v0 \times 100$, where v0 (mPa·s) is the viscosity of the colloidal dispersion A immediately after production, and v1 (mPa·s) is the viscosity of the colloidal dispersion A after stored at 25° C. for one month. The viscosity is measured with the same method as for the features (8), (9), and (10), or the liquid temperature is set at 25° C. and the viscosity is measured using a cone and plate viscometer. The term "immediately after production" herein intends to mean within 3 hours after production.

Table 2 in Patent Literature 1 lists the light transmittance of each dispersion containing a hydrated alumina particulate powder according to examples 1 to 10 dispersed in pure water to have 2.2% by weight of $Al_2O_3$: the lowest value is 30% and the highest value is 33% for the dispersions immediately after production, and the lowest value is 37% and the highest value is 42% for the dispersions 24 hours after production. In each of examples 1 to 10, when t0(%) is set as the light transmittance of the dispersion immediately after production and t1(%) as that of the dispersion 24 hours after production, the percentage of the light transmittance changes is calculated as follows: the lowest value is 23.3%; and the highest value is 31.3%. Compared with this, the colloidal dispersion A with the feature (6) has a light transmittance change within ±5% after stored at 25° C. for one month, revealing very high dispersion stability.

The alumina powder according to another embodiment of the present invention has the feature (8) bellow, in addition to the features (1) to (4) or the features (5) to (7).

(8) The colloidal dispersion A immediately after production has a viscosity of 20 mPa·s or less.

The feature (8) reveals the viscosity of the colloidal dispersion A immediately after production, revealing low viscosity. The viscosity is preferably not greater than 10 mPa·s.

The alumina powder according to still another embodiment of the present invention has the features (9) and/or (10), in addition to the feature (8).

(9) The colloidal dispersion A with the pH adjusted to 1 immediately after production using 10% by mass of aqueous nitric acid solution has a viscosity of 20 mPa·s or less.

(10) The colloidal dispersion A with the pH adjusted to 14 immediately after production using 10% by mass of aqueous sodium hydroxide solution has a viscosity of 20 mPa·s or less.

When the alumina powder has the feature (9) and/or (10) in addition to the feature (8), the colloidal dispersion A does not gel and maintains low viscosity even when added with acid or alkali. The viscosity in each of the features (9) and (10) is preferably not greater than 10 mPa·s. Some dispersions prepared using commercially available alumina powders may increase viscosity and form gel when added with acid or alkali.

The alumina powder according to one or more embodiments may have any proportion of the hydroxycarboxylic acid and any proportion of the alkaline component that satisfy at least all the features (1) to (4). In one embodiment, the mathematical equation for the proportion of hydroxycarboxylic acid=[the number of moles of hydroxycarboxylic acid]×[the number of carboxyl groups in the hydroxycarboxylic acid]÷[the number of moles of $Al_2O_3$ in the alumina powder] is used to set the proportion of the hydroxycarboxylic acid to at least 1, under which the proportion of the alkaline component is determined to satisfy the pH range of the feature (3). Any larger amount of the hydroxycarboxylic acid mostly does not affect the features (1) to (4), and thus no upper limit is set for the proportion of the hydroxycarboxylic acid. Considering that containing a large amount of hydroxycarboxylic acid can be wasteful, the upper limit of 3 may preferably be set for the proportion of the hydroxycarboxylic acid. When the proportion of the hydroxycarboxylic acid falls within the range of 1 to 3, the alumina powder can have all the features (1) to (4) while the amount of hydroxycarboxylic acid is also economically appropriate. The upper limit for the proportion of the hydroxycarboxylic acid may more preferably be 2.

The alkaline component may be in a proportion that is set in accordance with the proportion of the hydroxycarboxylic acid determined as described above to allow the colloidal dispersion A and the colloidal dispersion B to have the pH in the range defined by the feature (3). In one embodiment, the mathematical equation for the proportion of alkaline component=[the number of moles of alkaline component]÷([the number of moles of the hydroxycarboxylic acid]×[the number of carboxyl groups in the hydroxycarboxylic acid]) may be used to determine the proportion of alkaline component preferably in a range of 0.1 to 1, more preferably in a range of 0.2 to 0.8, and still more preferably in a range of 0.3 to 0.7.

In the mathematical equations for the proportion of the hydroxycarboxylic acid and the proportion of the alkaline component, [the number of moles of the hydroxycarboxylic acid]×[the number of carboxyl groups in the hydroxycarboxylic acid] is calculated for each hydroxycarboxylic acid when the alumina powder contains two or more hydroxycarboxylic acids, and the sum of them will be used for [the number of moles of the hydroxycarboxylic acid]×[the number of carboxyl groups in the hydroxycarboxylic acid].

The alumina powder according to one or more embodiments is composed of many particles. The alumina powder may have any particle size, but may preferably have a particle size not greater than 1000 μm. To easily obtain the colloidal dispersion A, the colloidal dispersion B, and the colloidal dispersion C, the particle size is preferably smaller, with the upper limit of, for example, preferably 100 μm, and more preferably 50 μm. The particle size may not have a lower limit, or may have, for example, a lower limit of 1 μm, although it may preferably have a lower limit of 0.1 μm. A preferable particle size is, for example, in a range of 0.1 to 100 μm. The upper limit for the particle size may be set for the maximum value of the largest lengths of particles captured in an SEM image by a scanning electron microscope (SEM). The lower limit for the particle size may be set for the minimum value of the largest lengths of particles captured in the SEM image. For the SEM image, the magnification is set as appropriate for measurement of the particle size. For example, the upper limit and the lower limit may be determined within the magnification range of 100× to 20000×. When the alumina powder according to one or more embodiments may not be dispersed well in a liquid depending on the particle size, the liquid may be stirred or may undergo an ultrasonic process as appropriate.

Although it is preferable that the alumina powder according to one or more embodiments does not contain even a least amount of components other than the hydroxycarboxylic acid and the alkaline component, the alumina powder may contain, for example, accessory components contained in the starting material, components derived from impurities, and components that cannot be removed in the production process. In other words, the alumina powder according to one or more embodiments preferably contains substantially the hydroxycarboxylic acid and the alkaline component only.

One embodiment of the present invention is directed to a colloidal dispersion obtained by the alumina powder described above dispersed in a liquid. The colloidal dispersion may contain $Al_2O_3$ at any concentration that allows the colloidal dispersion to be obtained. However, the colloidal dispersion may preferably contain $Al_2O_3$ at a concentration of 0.01 to 25% by mass. The alumina powder may be dispersed in any liquid to yield the colloidal dispersion. However, the liquid may preferably have a Hansen three-dimensional solubility parameter value (HSP value) of at least 13 $(cal/cm^3)^{1/2}$. Examples of such liquids, along with their HSP values, in $(cal/cm^3)^{1/2}$ (although not specified) will be listed below: water, 23.50; glycerin, 21.10; ethylene glycol, 16.30; monoethanolamine, 15.48; dipropylene glycol, 15.52; propylene glycol, 14.80; diethylene glycol, 14.60; methanol, 14.28; ethanol, 12.92; 1-propanol, 11.97; acetonitrile, 11.90; acetic acid, 10.50; ethyl acetate, 9.10; toluene, 8.91; and hexane, 7.24. Among the liquids listed above, liquids having the HSP value of at least 13 include water, glycerin, ethylene glycol, monoethanolamine, dipropylene glycol, propylene glycol, diethylene glycol, and methanol. The liquid having the HSP value of at least 13 may further include any liquid having the HSP value of at least 13 other than the liquids listed above. The liquid having the HSP value of at least 13 may further include a mixed liquid with the HSP value of at least 13, where one of constituting liquids solely has the HSP value of less than 13. The HSP value of the liquid is preferably at least 13.5, and more preferably at least 14.

The alumina powder according to one or more embodiments has various features described above, and thus has various applications to, for example, optical materials, electronic materials, various binders, coating agents, and catalyst carriers.

The alumina powder according to one or more embodiments containing the hydroxycarboxylic acid and the alkaline component and satisfying at least all the features (1) to (4) may be produced by any method. The proportion of each material to be mixed and the production conditions may be set as appropriate. In particular, the proportion of each material to be mixed may be designed appropriately to obtain the alumina powder according to one or more embodiments, particularly by considering the amount of components that may be volatilized or eliminated in the production processes, as well as the proportion of each component to be contained in the alumina powder according to one or more embodiments as described above. One example method includes adding appropriate amounts of hydroxycarboxylic acid and alkaline-component-containing compound to an aqueous solution of aluminum salt, heating the solution to obtain an alumina sol, and drying the alumina sol. Another example method includes adding an appropriate amount of alkaline-component-containing compound to an aqueous solution of aluminum salt of hydroxycarboxylic acid, heating the solution to obtain an alumina sol, and drying the alumina sol. Still another example includes adding appropriate amounts of hydroxycarboxylic acid and alkaline-component-containing compound to an aluminum hydroxide, heating the solution to obtain an alumina sol, and drying the alumina sol.

For those production methods described above, the amount of water may be adjusted as appropriate to obtain an alumina sol. Although the heating is performed to obtain colloidal particles, more heating increases the particle size. Thus, the heating conditions are adjusted as appropriate to obtain the alumina powder according to one or more embodiments. For example, the heating temperature may preferably be 50 to 200° C., and may more preferably be 70 to 150° C. The heating time may be set as appropriate for the heating temperature. For example, the heating time may be 0.5 to 12 hours. Any heating method, such as an ordinary heating method, hydrothermal treatment, or any other method, may be used. Any drying may be performed to obtain the alumina powder according to one or more embodiments. The drying may be performed with an ordinary method. The drying method includes spray-drying, stationary drying, and freeze-drying. Among them, spray-drying is preferable in obtaining powder with small particle sizes. The drying conditions (e.g., temperature and time) may be set as appropriate. A washing process may be optionally performed before the drying process to minimize excess components. The washing may be performed with an ordinary method such as ultrafiltration washing or filtration washing. Particularly when an aqueous solution of aluminum salt contains an inorganic acid, or when a metal salt is used as an alkaline-component-containing compound, the washing process may be performed to eliminate excess inorganic acid or metal component.

Among the materials used with the production method described above, aluminum salt and aluminum hydroxide may be selected from commercially available materials, or may be prepared with known methods. Examples of the alkaline-component-containing compound include a hydroxide of an alkali metal, a carbonate of an alkali metal, a hydrogencarbonate of an alkali metal, ammonia, ammonium carbonate, ammonium hydrogencarbonate, urea, and a water-soluble amine compound. Examples of the alkali metal and the water-soluble amine compound may be the same as those listed for the alkaline component.

EXAMPLES

Although the present invention will be described in more detail based on examples, the invention is not limited to those examples.

Example 1

Ammonia water was added to an aqueous solution of aluminum salt ($Al_2O_3$, 8.6% by mass; lactic acid, 12.2% by mass; pH, 4.5), and the resultant solution was then heated at 90° C. for 3 hours to obtain an alumina sol ($Al_2O_3$, 2.5% by mass; lactic acid, 3.5% by mass; ammonia, 0.4% by mass; pH, 8.3). The alumina sol was then dried at 100° C. for 12 hours with an air dryer to obtain an alumina powder ($Al_2O_3$, 38.0% by mass; lactic acid, 52.0% by mass; ammonia, 3.4% by mass) containing 0.1 to several hundreds micrometers of irregularly shaped particles.

Example 2

Ammonia water was added to an aqueous solution of aluminum salt ($Al_2O_3$, 8.6% by mass; malic acid, 1.6% by mass; lactic acid, 10.6% by mass; pH, 4.1), and the resultant solution was then hydrothermally treated at 140° C. for 3 hours to obtain an alumina sol ($Al_2O_3$, 2.5% by mass; malic acid, 0.4% by mass; lactic acid, 3.0% by mass; ammonia, 0.4% by mass; pH, 8.3). The alumina sol was then dried with a spray dryer ADL310 (Yamato Scientific Co., Ltd.) (the temperature at the entry, 200° C.; the temperature at the exit, 100° C.) to obtain an alumina powder ($Al_2O_3$, 37.2% by mass; malic acid, 6.1% by mass; lactic acid, 44.8% by mass; ammonia, 4.3% by mass) containing 1 to 10 µm of spherical particles.

Example 3

Ammonia water was added to an aqueous solution of aluminum salt ($Al_2O_3$, 6.0% by mass; lactic acid, 5.3% by mass; pH, 5.6), and the resultant solution was then heated at 100° C. for 3 hours to obtain an alumina sol ($Al_2O_3$, 5.0% by mass; lactic acid, 4.4% by mass; ammonia, 0.5% by mass; pH, 7.8). The alumina sol was then dried with a spray dryer BDP-15 (Ohkawara Kakohki Co., Ltd.) (the temperature at the entry, 210° C.; the temperature at the exit, 110° C.; the atomizer speed, 20000 revolutions) to obtain an alumina powder ($Al_2O_3$, 47.4% by mass; lactic acid, 41.9% by mass; ammonia, 3.2% by mass) containing 10 to 50 µm of spherical particles.

Example 4

Ammonia water was added to an aqueous solution of aluminum salt ($Al_2O_3$, 6.0% by mass; lactic acid, 14.3% by mass; pH, 4.0), and the resultant solution was then hydrothermally treated at 130° C. for 10 hours to obtain an alumina sol ($Al_2O_3$, 2.0% by mass; lactic acid, 4.8% by mass; ammonia, 0.7% by mass; pH, 6.5). The alumina sol was then dried with a spray dryer ADL310 (Yamato Scientific Co., Ltd.) (the temperature at the entry, 200° C.; the temperature at the exit, 100° C.) to obtain an alumina powder ($Al_2O_3$, 26.4% by mass; lactic acid, 63.0% by mass; ammonia, 6.2% by mass) containing 1 to 10 µm of spherical particles.

Example 5

Sodium hydroxide solution was added to an aqueous solution of aluminum salt ($Al_2O_3$, 8.4% by mass; lactic acid, 11.9% by mass; pH, 4.7), and the resultant solution was then hydrothermally treated at 140° C. for 5 hours to obtain an alumina sol ($Al_2O_3$, 2.5% by mass; lactic acid, 3.5% by mass; Na, 0.6% by mass; pH, 8.3). The alumina sol was then dried with an air dryer at 100° C. for 12 hours to obtain an alumina powder ($Al_2O_3$, 35.6% by mass; lactic acid, 50.3% by mass; Na, 8.0% by mass) containing 0.1 to several hundred micrometers of irregularly shaped particles.

Example 6

An aqueous solution of tetraethyl ammonium was added to an aqueous solution of aluminum salt ($Al_2O_3$, 8.4% by mass; lactic acid, 11.9% by mass; pH, 4.7), and the resultant solution was then hydrothermally treated at 140° C. for 5 hours to obtain an alumina sol ($Al_2O_3$, 2.5% by mass; lactic acid, 3.5% by mass; TEAH, 3.2% by mass; pH, 8.4). The alumina sol was then dried with an air dryer at 100° C. for 12 hours to obtain an alumina powder ($Al_2O_3$, 24.6% by mass; lactic acid, 34.8% by mass; TEAH, 32.0% by mass) containing 0.1 to several hundred micrometers of irregularly shaped particles.

Example 7

An aqueous solution of choline was added to an aqueous solution of aluminum salt ($Al_2O_3$, 8.4% by mass; lactic acid, 11.9% by mass; pH, 4.7), and the resultant solution was then hydrothermally treated at 140° C. for 5 hours to obtain an alumina sol ($Al_2O_3$, 2.5% by mass; lactic acid, 3.5% by mass; choline, 2.4% by mass; pH, 8.2). The alumina sol was then dried with an air dryer at 100° C. for 12 hours to obtain an alumina powder ($Al_2O_3$, 26.8% by mass; lactic acid, 37.9% by mass; choline, 25.5% by mass) containing 0.1 to several hundred micrometers of irregularly shaped particles.

Example 8

Ammonia water was added to an aqueous solution of aluminum salt ($Al_2O_3$, 8.0% by mass; glycolic acid, 11.3% by mass; pH, 4.4), and the resultant solution was then heated at 90° C. for 3 hours to obtain an alumina sol ($Al_2O_3$, 2.5% by mass; glycolic acid, 3.5% by mass; ammonia, 0.4% by mass; pH, 8.3). The alumina sol was then dried with an air dryer at 100° C. for 12 hours to obtain an alumina powder ($Al_2O_3$, 38.1% by mass; glycolic acid, 54.0% by mass; ammonia, 3.8% by mass) containing 0.1 to several hundred micrometers of irregularly shaped particles.

Example 9

Ammonia water was added to an aqueous solution of aluminum salt ($Al_2O_3$, 8.1% by mass; citric acid, 0.5% by mass; lactic acid, 12.2% by mass; pH, 4.1), and the resultant solution was then hydrothermally treated at 140° C. for 3 hours to obtain an alumina sol ($Al_2O_3$, 2.5% by mass; citric acid, 0.1% by mass; lactic acid, 3.8% by mass; ammonia, 0.5% by mass; pH, 8.3). The alumina sol was then dried with a spray dryer ADL310 (Yamato Scientific Co., Ltd.) (the temperature at the entry, 200° C.; the temperature at the exit, 100° C.) to obtain an alumina powder ($Al_2O_3$, 34.9% by mass; citric acid, 2.0% by mass; lactic acid, 52.4% by mass; ammonia, 4.7% by mass) containing 1 to 10 μm of spherical particles.

Preparation of Colloidal Dispersion

The alumina powder of example 1 and distilled water were mixed to contain 2.5% by mass of $Al_2O_3$, and then the solution was stirred to obtain a colloidal dispersion A1. Further, the alumina powder of example 1 and distilled water were mixed to contain 15% by mass of $Al_2O_3$, and then the solution was stirred to obtain a colloidal dispersion B1. Further, the alumina powder of example 1 and methanol were mixed to contain 2.5% by mass of $Al_2O_3$, and then the solution was stirred to obtain a colloidal dispersion C1.

The alumina powder of each of examples 2 to 9 was also used in the same manner as in example 1 to obtain respective colloidal dispersions A2 to A9 (dispersion medium, water; $Al_2O_3$ concentration, 2.5% by mass), colloidal dispersions B2 to B9 (dispersion medium, water; $Al_2O_3$ concentration, 15% by mass), and colloidal dispersions C2 to C9 (dispersion medium, methanol; $Al_2O_3$ concentration, 2.5% by mass).

Testing

The alumina powders and the colloidal solutions were evaluated and measured with the methods described below.

Particle Shape and Size

The particle shape was observed using an SEM image captured with a scanning electron microscope (JSM-6010LA; JEOL Ltd.). The range of particle sizes was determined as follows: the upper limit was set for the maximum value of the largest lengths of particles captured in the SEM image; and the lower limit was set for the minimum value of the largest lengths of particles captured in the SEM image.

Alumina Crystalline Structure

The alumina powder obtained in each of examples 1 to 9 was measured with an X-ray diffractometer XRD-7000 (Shimadzu Corporation) to analyze the crystalline structure. The results reveal pseudoboehmite in the alumina powder of each of examples 1 to 3 and 5 to 9, and amorphous in the alumina powder of example 4.

Precipitate Formation

The state was visually checked.

Measurement of Light Transmittance

The light transmittance was measured with an ultraviolet-visible-near-infrared spectrophotometer V-670 (JASCO Corporation) at a wavelength of 500 nm and an optical path length of 10 mm.

Measurement of Viscosity

The viscosity of the colloidal dispersion with the liquid temperature adjusted to 25° C. was measured with a cone and plate viscometer (TVE-25 viscometer, Toki Sangyo Co., Ltd.).

Table 1 shows the results for each colloidal dispersion immediately after production and for each colloidal dispersion stored at 25° C. for one month.

TABLE 1

| Colloidal dispersion | $Al_2O_3$ conc. (wt %) | Immediately after production of colloidal dispersion | | | | After storage of colloidal dispersion at 25° C. for 1 month | | |
|---|---|---|---|---|---|---|---|---|
| | | Whether precipitate formed | pH | Light transmit (%) | Viscosity (mPa·s) | Whether precipitate formed | Light transmit (%) | Viscosity (mPa·s) |
| A1 | 2.5 | no | 5.6 | 94.5 | 1.4 | no | 94.7 | 1.4 |
| A2 | 2.5 | no | 6.7 | 94.4 | 1.2 | no | 94.8 | 1.3 |
| A3 | 2.5 | no | 5.7 | 94.4 | 1.6 | no | 94.6 | 1.9 |
| A4 | 2.5 | no | 5.7 | 94.6 | 1.5 | no | 94.7 | 1.5 |
| A5 | 2.5 | no | 8.0 | 95.4 | 1.5 | no | 95.3 | 1.6 |
| A6 | 2.5 | no | 8.1 | 95.3 | 1.6 | no | 95.1 | 1.9 |
| A7 | 2.5 | no | 7.8 | 94.9 | 1.4 | no | 95.0 | 1.6 |
| A8 | 2.5 | no | 5.8 | 94.3 | 1.5 | no | 94.6 | 1.5 |
| A9 | 2.5 | no | 6.8 | 92.8 | 1.3 | no | 93.5 | 1.3 |
| B1 | 15 | no | 6.0 | 86.4 | 16.2 | no | | |
| B2 | 15 | no | 7.0 | 60.7 | 21.5 | no | | |
| B3 | 15 | no | 5.9 | 87.2 | 16.7 | no | | |
| B4 | 15 | no | 6.1 | 86.9 | 16.3 | no | | |
| B5 | 15 | no | 8.1 | 91.0 | 15.6 | no | | |
| B6 | 15 | no | 8.0 | 91.3 | 15.4 | no | | |
| B7 | 15 | no | 7.9 | 90.1 | 16.1 | no | | |
| B8 | 15 | no | 6.1 | 89.4 | 18.9 | no | | |
| B9 | 15 | no | 6.9 | 54.2 | 23.6 | no | | |
| C1 | 2.5 | no | — | 96.7 | ≤1.0 | no | | |
| C2 | 2.5 | no | — | 92.0 | ≤1.0 | no | | |
| C3 | 2.5 | no | — | 95.1 | ≤1.0 | no | | |
| C4 | 2.5 | no | — | 95.6 | ≤1.0 | no | | |
| C5 | 2.5 | no | — | 95.6 | ≤1.0 | no | | |
| C6 | 2.5 | no | — | 95.7 | ≤1.0 | no | | |
| C7 | 2.5 | no | — | 95.7 | ≤1.0 | no | | |
| C8 | 2.5 | no | — | 94.9 | ≤1.0 | no | | |
| C9 | 2.5 | no | — | 91.7 | ≤1.0 | no | | |

For the colloidal dispersions A1 to A9, B1 to B9, and C1 to C9 immediately after production, as shown in Table 1, (i) no precipitate formed, (ii) the light transmittance was at least 80% for A1 to A9 and C1 to C9, and (iii) the pH was in the range of 5 to 8 for A1 to A9 and B1 to B9. The results reveal that the alumina powder obtained in each of examples 1 to 9 has the features (1) to (4).

As shown in Table 1, no precipitate was observed in each of the colloidal dispersions A1 to A9 and B1 to B9 stored at 25° C. for one month. For the colloidal dispersions A1 to A9, the percentage change of the light transmittance of the colloidal dispersion after stored at 25° C. for one month with respect to the light transmittance of the colloidal dispersion immediately after production was calculated. The percentage change was 0.2% for A1, 0.4% for A2, 0.2% for A3, 0.1% for A4, 0.1% for A5, 0.2% for A6, 0.1% for A7, 0.3% for A8, and 0.8% for A9. For each of the colloidal dispersions A1 to A9, the percentage change of the viscosity of the colloidal dispersion after stored at 25° C. for one month with respect to the viscosity of the colloidal dispersion immediately after production was calculated. The percentage change was 0% for A1, 8.3% for A2, 18.8% for A3, 0% for A4, 6.7% for A5, 18.8% for A6, 12.5% for A7, 0% for A8, and 0% for A9. The results reveal that the alumina powder obtained in each of examples 1 to 9 also has the features (5) to (7).

The results further reveal that the colloidal dispersions A1 to A9 have the feature (8) based on the viscosity immediately after production.

Further, the viscosity was 2.0 mPa·s for the colloidal dispersion A1, and 2.5 mPa·s for the colloidal dispersion A2 after 10% by mass of an aqueous nitric acid solution was added to set the pH to 1. The viscosity was 1.4 mPa·s for the colloidal dispersion A1, and 1.3 mPa·s for the colloidal dispersion A2 after 10% by mass of an aqueous sodium hydroxide solution was added to set the pH to 14. The results reveal that the colloidal dispersions A1 and A2 also have the features (9) and (10).

The alumina powder obtained in each of examples 1, 3, and 4 was mixed into propylene glycol (HSP, 14.80), monoethanolamine (HSP, 15.48), ethylene glycol (HSP, 16.30), and glycerin (HSP, 21.10), all of which are liquids, to contain 2.5% by mass of $Al_2O_3$, and each resultant solution were then stirred, forming a colloidal dispersion with no precipitate.

Water was added as a dispersion medium to the alumina powder obtained in example 1, and the resultant solution was treated with ultrasonic waves (desktop ultrasonic cleaner UCT-1331, Tokyo Ultrasonic Engineering Co., Ltd.) for one hour, and the resultant solution was stirred for 24 hours, forming a colloidal dispersion containing $Al_2O_3$ at a concentration of 24% by mass. In the above processes, ethylene glycol was used as a dispersion medium in place of water to form a colloidal dispersion containing $Al_2O_3$ at a concentration of 20% by mass. In the above processes, methanol was used as a dispersion medium in place of water to form a colloidal dispersion containing $Al_2O_3$ at a concentration of 18% by mass. No precipitate was observed in each of the colloidal dispersions.

The invention claimed is:
1. An alumina powder, comprising:
a hydroxycarboxylic acid; and
an alkaline component,
the alumina powder containing amorphous alumina, pseudoboehmite, or boehmite,
wherein the alumina powder satisfies all of (1) to (4):
(1) a colloidal dispersion A with 2.5% by mass of $Al_2O_3$ consisting of the alumina powder and distilled water is free from precipitate, and the colloidal dispersion A has a light transmittance of at least 80% measured at a wavelength of 500 nm and an optical path length of 10 mm,
(2) a colloidal dispersion B with 15% by mass of $Al_2O_3$ consisting of the alumina powder and distilled water is free from precipitate,
(3) the colloidal dispersion A and the colloidal dispersion B each have a pH in a range of 5 to 8, and
(4) a colloidal dispersion C with 2.5% by mass of $Al_2O_3$ consisting of the alumina powder and methanol is free from precipitate, and the colloidal dispersion C has a light transmittance of at least 80% measured at a wavelength of 500 nm and an optical path length of 10 mm.

2. The alumina powder according to claim 1, wherein the hydroxycarboxylic acid is at least one component selected from the group consisting of lactic acid, malic acid, glycolic acid, citric acid, and tartaric acid.

3. The alumina powder according to claim 1, wherein the alkaline component is at least one component selected from the group consisting of an alkali metal, ammonia, and a water-soluble amine compound.

4. The alumina powder according to claim 1, wherein the alumina powder satisfies at least one of (5) to (7):
(5) the colloidal dispersion A and the colloidal dispersion B are free from precipitate after stored at 25° C. for one month,
(6) the colloidal dispersion A stored at 25° C. for one month has a light transmittance change within ±5% from a light transmittance of the colloidal dispersion A immediately after production, and
(7) the colloidal dispersion A stored at 25° C. for one month has a viscosity change within ±25% from a viscosity of the colloidal dispersion A immediately after production.

5. The alumina powder according to claim 1, wherein (8) the colloidal dispersion A immediately after production has a viscosity of 20 mPa·s or less.

6. A colloidal dispersion containing the alumina powder according to claim 1 dispersed in a liquid.

7. An alumina powder, comprising:
a hydroxycarboxylic acid; and
an alkaline component,
the alumina powder containing amorphous alumina, pseudoboehmite, or boehmite,
wherein the alumina powder satisfies all of (1) to (4) and (8):
(1) a colloidal dispersion A with 2.5% by mass of $Al_2O_3$ consisting of the alumina powder and distilled water is free from precipitate, and the colloidal dispersion A has a light transmittance of at least 80% measured at a wavelength of 500 nm and an optical path length of 10 mm, and the colloidal dispersion A immediately after production has a viscosity of 20 mPa·s or less,
(2) a colloidal dispersion B with 15% by mass of $Al_2O_3$ consisting of the alumina powder and distilled water is free from precipitate,
(3) the colloidal dispersion A and the colloidal dispersion B each have a pH in a range of 5 to 8,
(4) a colloidal dispersion C with 2.5% by mass of $Al_2O_3$ consisting of the alumina powder and methanol is free from precipitate, and the colloidal dispersion C has a light transmittance of at least 80% measured at a wavelength of 500 nm and an optical path length of 10 mm, and (8) the colloidal dispersion A immediately after production has a viscosity of 20 mPa·s or less, and wherein the alumina powder satisfies at least one of (9) and (10):

(9) the colloidal dispersion A with the pH adjusted to 1 immediately after production using 10% by mass of aqueous nitric acid solution has a viscosity of 20 mPa·s or less, and

(10) the colloidal dispersion A with the pH adjusted to 14 immediately after production using 10% by mass of aqueous sodium hydroxide solution has a viscosity of 20 mPa·s or less.

8. The alumina powder according to claim 7, wherein the hydroxycarboxylic acid is at least one component selected from the group consisting of lactic acid, malic acid, glycolic acid, citric acid, and tartaric acid.

9. The alumina powder according to claim 7, wherein the alkaline component is at least one component selected from the group consisting of an alkali metal, ammonia, and a water-soluble amine compound.

10. The alumina powder according to claim 7, wherein the alumina powder satisfies at least one of (5) to (7):

(5) the colloidal dispersion A and the colloidal dispersion B are free from precipitate after stored at 25° C. for one month, (6) the colloidal dispersion A stored at 25° C. for one month has a light transmittance change within ±5% from a light transmittance of the colloidal dispersion A immediately after production, and (7) the colloidal dispersion A stored at 25° C. for one month has a viscosity change within ±25% from a viscosity of the colloidal dispersion A immediately after production.

11. A colloidal dispersion containing the alumina powder according to claim 7 dispersed in a liquid.

* * * * *